Patented Aug. 18, 1931

1,819,145

UNITED STATES PATENT OFFICE

WALTER BECK, OF FRANKFORT-ON-THE-MAIN, GERMANY, ASSIGNOR TO DEUTSCHE GOLD & SILBER SCHEIDEANSTALT, VORMALS ROESSLER, OF FRANKFORT-ON-THE-MAIN, GERMANY, A CORPORATION

METHOD FOR THE DESTRUCTION OF ANIMAL PESTS

No Drawing. Application filed January 9, 1926, Serial No. 80,361, and in Germany September 1, 1925.

This invention is an improvement of the method of destroying noxious animals by poisonous gases.

The invention depends upon the fact that I have found it possible to obtain, by the combination of two or more poisonous gases, a poisonous action which exceeds the combined action of the single gases This action makes possible the combating of vermin with greater effect. Such pairings of poisons are excellently suitable for combating vermin residing in underground passages and buildings, as, in consequence of the rapid poisonous action, the animals are not able to reach the outside air by one of the many exits usually at hand.

My invention may be illustrated by the following example:

Hydrogen sulfide has been used, and also carbon monoxide for combating vermin of the kind mentioned above. If both gases are used simultaneously a poisonous action is obtained which greatly exceeds the separate action. The components of the paired poisonous gas may be generated separately and then mixed with one another for use. They may also be generated together preferably at the place of application.

The advantageous paired action may be illustrated by an example:

A concentration of 0.08–0.09% (by volume) of hydrogen sulphide is necessary to kill white mice quickly. To obtain the same action a concentration of 0.6–0.7% (by volume) of carbon monoxide is necessary. By using equal parts (by volume) of a mixture of both gases, 0.06% (by volume) of hydrogen sulphide and 0.5% (by volume) of carbon monoxide are sufficient to obtain the same deadly action.

It has been found advantageous to generate the toxic gas mixture at its place of application from compositions of matter which on burning produce hydrogen sulphide on the one hand and carbon monoxide on the other.

Such compositions may comprise for instance sulphur and sawdust or other carbon compounds containing hydrogen as component generating sulphide of hydrogen and carbonaceous materials such as charcoal, sawdust or in some cases a mixture of more than one, as components which are capable of producing carbon monoxide and in addition substances such as potassium nitrate for supplying oxygen. Generally speaking the mixtures have to be composed in such a way as to allow for their being easily ignited burning smoothly even when the outer air is excluded. For the latter purpose they may contain for instance compositions which act like gun powder or in the fashion of thermit. Since many substances which serve as starting materials for the generation of the toxic gases such as sulphur, saltpeter, carbon are also capable of initiating the reaction or keeping it going, it is possible to compose the whole mixture of relatively few substances only A suitable mixture for obtaining simultaneously hydrogen sulphide and carbon monoxide on ignition may be composed for for example as follows:

40 parts by weight sulphur,
15 parts by weight sawdust,
20 parts by weight potassium nitrate,
2 parts by weight wood charcoal,
30 parts by weight iron powder.

The metal powder in this mixture reacts with the other compounds of the composition and thereby supplies the necessary heat. According to the properties of the iron powder, added for instance, its fineness, the quantity added or the like, the speed of the burning can be regulated within wide limits.

As the metal is not an essential reaction component of the present invention for the generation of hydrogen sulphide and carbon monoxide iron or other metals may be omitted altogether. A mixture free from metal may be composed for example as follows:

30 parts by weight sawdust,
40 parts by weight sulphur,
38 parts by weight potassium nitrate,
2 parts by weight wood charcoal.

Compositions of the latter kind are advantageous for instance as regards the yield of hydrogen sulphide which is relatively greater than the quantity generated by mixtures containing iron.

These mixtures contain the oxygen necessary for the combination, so a supply of air for the combustion is not necessary. The combustion can be carried out suitably in the room to be treated, or in an ante-room and then by diffusing the mixture of poisonous gas rapidly by its own pressure the underground passages and holes are also treated.

It is unnecessary to convert the mixtures containing the components into forms or shapes which make it impossible for the components to separate again. The powdery compositions, therefore, can be applied after they have been put simply into shells or cartridges or the like which may consist for instance of paper card board or substances of a similar kind. Or the cartridges can be burned in a specially designed apparatus which consists in a tube closed at one end but having an opening at the other which after the cartridge has been ignited is introduced into an aperture of an animal habitation for example a mouse hole. When using these the mixture is advantageously put into a cartridge having an open end which projects into one of the openings of a passage.

Combined poisonous gases or vapors can be used alone or in mixture with other gases of an inert or toxic material. A rapid diffusion of the mixture of poisonous gas in the rooms to be treated can be produced with the assistance of inert gases. In this case care should be taken that the poisonous action is not reduced by dilution of the mixture of gases below the degree required. The use of other poisonous gases or vapors forms a three-membered mixture. It has for instance been shown that the paired poisonous gases of hydrogen sulphide and carbon monoxide can be used in combination with a poison like carbon oxysulphide. Furthermore, such poisons can be admixed with other poisons which after the dissipation of the gas remaining in the gasified spaces, underground buildings, etc. will prevent the new colonization of noxious animals. An example of such a poison is arsenic oxide. If arsenic sulphide is added to the above mentioned inflammable substances arsenic oxide is deposited in the passages and holes. Other substances which vaporize and decompose when the mixture is ignited, and thus act as auxiliary toxic gases are for example naphthalin, camphor, paradichlorobenzene, hexachloroethene and the like.

In many cases it has been found advantageous in gasifying underground passages, to add finely divided sulphur, tarry distillation products of organic compounds etc. to the inflammable substance, and in this way disclose by smoke the various outlet passages of the underground system.

A poisonous gas pair consisting of carbon monoxide and cyanogen gas (or hydrocyanic acid or gaseous hydrocyanic acid compounds) is secured by mixing compounds containing carbon (such as charcoal, sawdust, etc.) with compounds giving oxygen (e. g. potassium nitrate) with addition of cyanogen compounds. For example:

35.53 parts by weight sawdust,
42.11 parts by weight potassium nitrate,
18.42 parts by weight dicyandiamide,
$CH.NH.C(:NH).NH_2$,
3.94 parts by weight charcoal.

The quantity of gas, the composition and duration of burning are, of course, somewhat variable in all cases.

A simple test is sufficient in determining whether the paired-action is greater than the combined action of the poisonous gases. By this test it is ascertained what combination of poisonous gases is capable of forming effective working-pairs. Also, one can determine by a simple test, the quantitative proportion for optimum results.

It has been found advantageous to compose the mixtures in such a way that instead of burning away suddenly they burn quietly and smoothly, the burning extending over time whilst a continuous current of the toxic gases is generated. This has the advantage —amongst others—that a single cartridge allows for gasifying several underground passages and holes. In consequence, instead of using a great number of small cartridges one is able to use a single slowly burning cartridge of greater dimensions, thereby reducing also the production costs.

What I claim is:

1. Product for the liberation of poisonous gases for use in the destruction of animal pests which consists of a mixture of 40 parts by weight sulphur, 38 parts by weight potassium nitrate, 30 parts by weight sawdust and 2 parts by weight charcoal.

2. Product for the liberation of poisonous gases for use in the destruction of animal pests which consists of a mixture of sulphur, potassium nitrate, sawdust, and charcoal in such proportions that it will liberate hydrogen sulphide and carbon monoxide upon combustion.

Signed at Frankfort-on-the-Main, Germany, this 21st day of December, A. D. 1925.

DR. WALTER BECK.